(12) United States Patent
Beardow

(10) Patent No.: US 7,800,630 B2
(45) Date of Patent: Sep. 21, 2010

(54) METHOD AND APPARATUS FOR IMAGE CONSTRUCTION AND ANIMATION

(76) Inventor: Paul Beardow, 19 Runneymead Rd., Egham, Surrey TW20 9BE (GB)

( * ) Notice: Subject to any disclaimer, the term of this patent is extended or adjusted under 35 U.S.C. 154(b) by 564 days.

(21) Appl. No.: 10/500,260

(22) PCT Filed: Dec. 11, 2002

(86) PCT No.: PCT/GB02/05609

§ 371 (c)(1),
(2), (4) Date: Jun. 15, 2004

(87) PCT Pub. No.: WO03/050763

PCT Pub. Date: Jun. 19, 2003

(65) Prior Publication Data

US 2005/0073527 A1    Apr. 7, 2005

(30) Foreign Application Priority Data

Dec. 11, 2001    (GB) ................................. 0129577.3
Feb. 14, 2002    (GB) ................................. 0203500.4

(51) Int. Cl.
*G09G 5/00* (2006.01)
(52) U.S. Cl. ................... 345/619; 345/629; 345/630; 345/636; 345/473; 345/474
(58) Field of Classification Search .................. None
See application file for complete search history.

(56) References Cited

U.S. PATENT DOCUMENTS 4,026,555 A * 5/1977 Kirschner et al. .............. 463/3
5,600,767 A * 2/1997 Kakiyama et al. ........... 345/629
5,729,674 A    3/1998 Walter
5,784,001 A * 7/1998 Deluca et al. .............. 340/7.56

(Continued)

FOREIGN PATENT DOCUMENTS

| EP | 603892 A1   | 6/1994 |
| EP | 603892 A1 * | 6/1994 |
| EP | 669600 A2   | 8/1995 |
| EP | 669600 A2 * | 8/1995 |
| JP | 07-239943   | 9/1995 |

(Continued)

OTHER PUBLICATIONS

Author: Kohno et al.; Title: Systematic Approach for Creating Animated Character Interfaces; Publisher: IEEE; Year: 2000; pp. 231-234.*

*Primary Examiner*—Kee M Tung
*Assistant Examiner*—Jwalant Amin

(57) ABSTRACT

A method and apparatus for generating, sending, receiving and reconstructing an image, for use, for example, over a mobile telephone network (10, 12, 14, 20) comprises means to prepare the image by selecting pre-stored parts image (24, 30, 34, 38, 42, 46) to be assembled as part of an entire image where the properties of the part images are specified, specification including the viewpoint, position of a part image, color, texture, movement, speed, time and times of visibility. The assembled image is coded as a text message to be sent to a receiving mobile telephone (20). The receiving mobile telephone (20) can decode the coded text message and display the coded image, can display a true text message with the image, can store and display an image as an indication of a person who has contacted that mobile telephone (20), and can store and add images to other messages. The part images (24, 30, 34, 38, 42, 46) can be downloaded from a central store (14). The text messages can be compacted.

47 Claims, 16 Drawing Sheets

U.S. PATENT DOCUMENTS

| | | | |
|---|---|---|---|
| 6,044,248 A * | 3/2000 | Mochizuki et al. | 340/7.47 |
| 6,054,999 A * | 4/2000 | Strandberg | 345/474 |
| 6,137,836 A | 10/2000 | Tero | |
| 6,263,089 B1 * | 7/2001 | Otsuka et al. | 382/107 |
| 6,377,276 B1 * | 4/2002 | Ludtke | 345/620 |
| 6,606,486 B1 * | 8/2003 | Cubbage et al. | 455/186.2 |
| 6,968,158 B1 * | 11/2005 | Bhuta et al. | 455/68 |
| 7,095,413 B2 * | 8/2006 | Shibao | 345/473 |
| 2002/0075284 A1 * | 6/2002 | Rabb, III | 345/646 |
| 2005/0156947 A1 * | 7/2005 | Sakai et al. | 345/629 |

FOREIGN PATENT DOCUMENTS

| | | | |
|---|---|---|---|
| JP | 08172622 A * | 7/1996 | |
| JP | 08172622 A | 7/1996 | |
| JP | 2000-293710 | 10/2000 | |
| JP | 2001-273457 | 10/2001 | |
| JP | 2001-325400 | 11/2001 | |

* cited by examiner

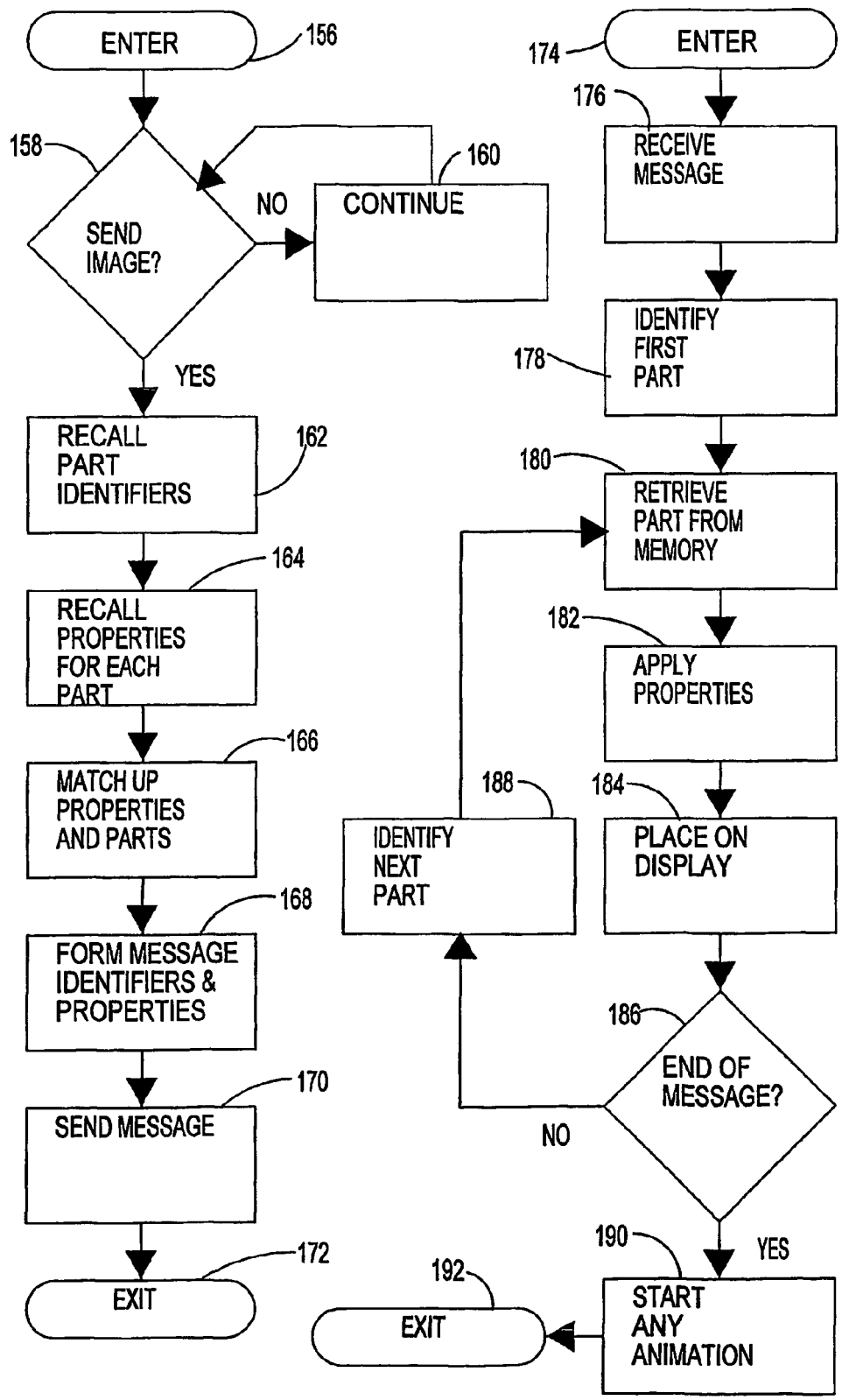
FIGURE 11          FIGURE 12

FIRST LETTER OF IMAGE CODE a b c d e f g h i j k l m n o p q r s t u v w x y z

SECOND LETTER OF IMAGE CODE a b c d e f g h i j k l m n o p q r s t u v w x y z

| 0 | 0 | 0 | 0 | 0 |
|---|---|---|---|---|
| 1 | 0 | 0 | 0 | 0 |
| 2 | 0 | 0 | 0 | 0 |
| 0 | 1 | 0 | 0 | 0 |
| 1 | 1 | 0 | 0 | 0 |
| 2 | 1 | 0 | 0 | 0 |

| 001 |
|---|
| 002 |
| 003 |

| aa |
|---|
| ab |
| ac |

| 0 | 2 | 2 | 2 | 2 |
|---|---|---|---|---|
| 1 | 2 | 2 | 2 | 2 |
| 2 | 2 | 2 | 2 | 2 |

| 241 |
|---|
| 242 |
| 243 |

| i g |
|---|
| i h |
| i i |

FIGURE 15

METHOD AND APPARATUS FOR IMAGE CONSTRUCTION AND ANIMATION

FIELD OF THE INVENTION

The present invention relates to apparatus capable of displaying an image (for example, on a screen). More particularly, the present invention relates also to apparatus, capable of displaying an image, and having a very low bandwidth or capacity for receiving or sending images to another apparatus and very low internal processing capacity.

BACKGROUND OF THE INVENTION

Systems, according to the field of the invention, as recited above, come in many forms. These can range from, but are not limited to, computers, computer terminals, television and video displays, PDA's (personal digital assistants) and higher generation mobile telephones. The discussion and disclosure of the present invention is directed towards mobile telephones. However, notwithstanding this focus of attention, it to be understood that the invention is not limited thereto and can be applied, with advantage, in all of the fields mentioned above.

With the ability to display images, higher generation mobile telephones have sought to exploit images to provide ease and entertainment to the functioning of the mobile telephone. However, each image displayed requires a certain minimum amount of data, either received by the radio link or retrieved from the memory, or both. Until now, each image has been a high data content construct, directly retrieved, or has had a relatively smaller data content, which has required to be expanded by copious processing to turn the small amount of data into an elaborate result. Either way, high bandwidth, high processing capacity, high data storage capacity, or all three, are required. The present invention seeks to provide a method and apparatus whereby a new image can be acquired and displayed with the minimum of bandwidth, processing capacity or data storage.

Progress towards more sophisticated services demands not only that an image should be present, but, if at all possible, that it should be animated. Animation places an enormous overhead on an already over strained display system. Animation requires the generation or acquisition of multiple views of an object or image, and their application to a display sequence. The present invention seeks to provide means for image animation which considerably reduces the proportional additional overhead usually required in image animation, and place it within the range of capability of a low bandwidth, low memory, low processing capacity system.

Higher generation mobile telephone users seek to employ selectable images and animations in their interactions with other users. Individual images are large, and require high bandwidth, unacceptable delays, and high storage and processing capacity to send and to be received. Even when received once, from a server, for later multiple use, individual images, especially if animated, still suffer from the same limitations and constraints. The present invention seeks to provide means whereby one mobile telephone may send to or receive from another mobile telephone a new animation and/or image with the minimum requirement for bandwidth, time, memory or data processing capacity on the part of either mobile telephone or on the part of the intervening communications system.

SUMMARY OF THE INVENTION

According to a first aspect, the present invention consists in a method for generating an image for display; said method including the steps of: selecting a set of part images from among a plurality of part images; specifying a position, to be occupied in the display, for each part image in said set of part images; specifying the properties for each part image in said set of part images; and displaying each part image according to the specifications.

According to a second aspect, the present invention consists in a method for transmitting an image, said method including the steps of: sending a signal to specify a set of part images from among a plurality of part images; sending a signal to specify a position, to be occupied in the display, for each part image in said set of part images; and sending a signal to specify the properties for each part image in said set of part images.

According to a third aspect, the present invention consists in a method for receiving and generating an image, said method including the steps of: receiving a signal to specify a set of part images from among a plurality of part images; receiving a signal to specify a position, to be occupied in the display, for each part image in said set of part images; receiving a signal to specify the properties for each part image in said set of part images; and responding to said signals to generate and display the specified image.

According to a fourth aspect, the present invention consists in an apparatus for generating an image for display; said apparatus comprising: means to select a set of part images from among a plurality of part images; means to specify a position, to be occupied in the display, for each part image in said set of part images; means to specify the properties for each part image in said set of part images; and means to display each part image according to the specifications.

According to a fifth aspect, the present invention consists in an apparatus for transmitting an image, said apparatus comprising: means to send a signal to specify a set of part images from among a plurality of part images; means to send a signal to specify a position, to be occupied in the display, for each part image in said set of part images; and means to send a signal to specify the properties for each part image in said set of part images.

According to a sixth aspect, the present invention consists in an apparatus for receiving and generating an image, said apparatus comprising: means to receive a signal to specify a set of part images from among a plurality of part images; means to receive a signal to specify a position, to be occupied in the display, for each part image in said set of part images; means to receive a signal to specify the properties for each part image in said set of part images; and means, responsive to said signals, to generate and display the specified image.

The present invention further provides for the specification of a viewpoint.

The present invention further provides that the specification of the properties of each part image in said set of part images can include specification of the colour of each part image in said set of part images.

The present invention further provides that the specification of the properties of each part image in said set of part images can include specification of the texture of each part image in said set of part images.

The present invention further provides that the specification of the properties of each part image in said set of part images can include specification of a cladding to be applied to each part image in said set of part images.

The present invention further provides that the specification of the properties of each part image in said set of part images can include specification of the orientation of each part image in said set of part images.

The present invention further provides that the specification of the properties of each part image in said set of part images can include specification of the size of each part image in said set of part images.

The present invention further provides that the specification of the properties of each part image in said set of part images can include specification of the transparency of each part image in said set of part images.

The present invention further provides that the specification of the properties of each part image in said set of part images can include specification of the direction of movement or movements of each part image in said set of part images.

The present invention further provides that the specification of the properties of each part image in said set of part images can include specification of the type of movement or movements of each part image in said set of part images.

The present invention further provides that the specification of the properties of each part image in said set of part images can include specification of the speed of movement or movements of each part image in said set of part images.

The present invention further provides that the specification of the properties of each part image in said set of part images can include specification of the times to be displayed for each part image in said set of part images.

The present invention further provides that the apparatus can be a computer, a personal digital assistant or a mobile telephone.

The present invention further provides that sets of part images can be obtained from a server in a network, and that the network can be a mobile telephone network.

The invention further provides that images and/or animations can be sent or received in the form of a text message.

The invention further provides that The invention further provides that the image may be appended to a text message.

The invention further provides for compaction of the codes, representative of the image.

BRIEF INTRODUCTION TO THE DRAWINGS

The invention is further explained, by way of example, by the following description, taken in conjunction with the appended drawings, in which:

PARTICULAR DESCRIPTION

FIG. 11 is a flowchart showing how an image can be assembled and sent as a text message. And FIG. 12 is a flowchart showing how an image can be received as a text message.

FIG. 14 depicts possible combinations represented by two characters.

FIG. 15 shows one example of utilizing compacted sending codes.

Figure 1:
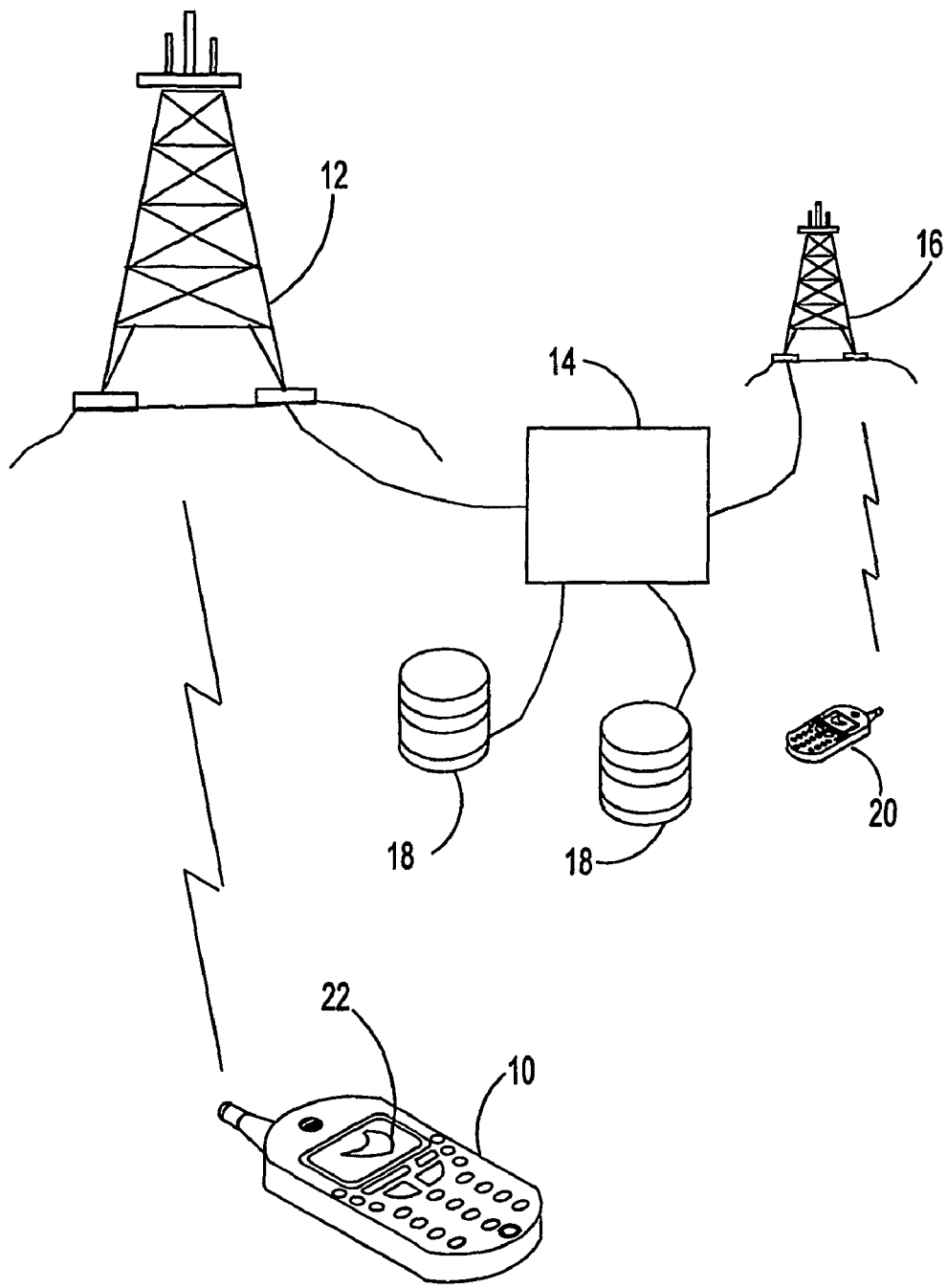
FIG. 1 is a schematic diagram of the environment in which the preferred embodiment can be practised.

Attention is drawn to FIG. 1, showing the general environment in which the preferred embodiment of the invention is practised.

A mobile telephone 10 is in radio communication with a mobile telephone network base station 12 which is, in turn, connected via the terrestrial telephone network 14 to other base stations 16 and one or more servers 18. The terrestrial telephone network 14 can comprise land lines, high band width cables, and microwave and satellite links. The terrestrial telephone network 14 allows connection to other mobile telephones 20, fixed telephones and fixed computer terminals. A mobile telephone 10 can access a server 18 for data, information and other resources. The base stations 12 can be on any style or generation of mobile telephone system, provided it has the ability to transfer and display images. The mobile telephone 10, which in this example is taken to be a mobile telephone 10 capable of sending and receiving images according to the present invention, comprises a screen 22 capable of displaying images.

The mobile telephone 10 is the preferred method of transmission and reception in the chosen embodiment of the present invention. It is to be appreciated that the present invention encompasses any means for sending and receiving text messages and is not limited to mobile telephones 10, 20 or a mobile telephone network 12, 14, 16. The present invention equally allows, for example, personal digital assistants (PDA), computers and computer terminals to communicate through any other system including, for example, the Internet, by satellite, or by direct wire or cable connection.

Attention is drawn to FIGS. 2A to 2F, showing one way in which an image can be assembled, according to the present invention.

Figure 2A:
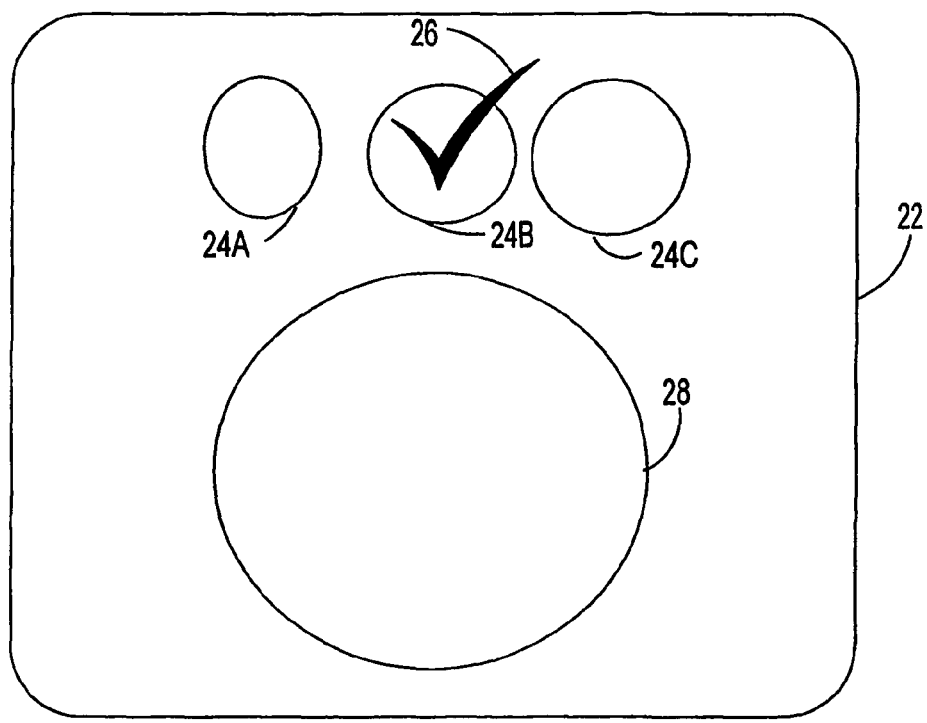
FIGS. 2A to 2F show how an image of a face can be constructed, according to the present invention.

FIG. 2A shows a first stage in a possible process, within the present invention, whereby an image of a (caricature or cartoon) human face may be assembled.

The first stage in assembling an image of a face is to choose the facial outline. The user is presented with facial outlines 24A, 24B and 24C on the screen 22 of the mobile telephone 10. In this example, a selection tick 26 can be moved by the user, under control of buttons on the mobile telephone 10 to lay over a selectable one of the facial outlines 24A, 24B and 24C and then be activated to produce the selective facial outline 28 which, in this case, is a horizontally oblate shape.

Figure 2B:
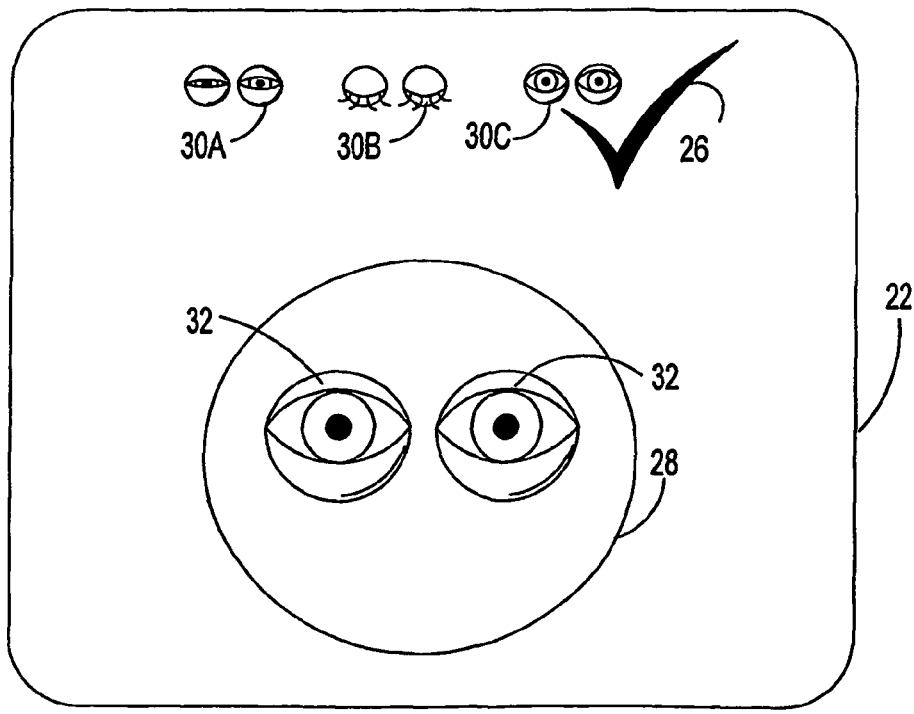

FIG. 2B shows the next stage in constructing an image of a face, where a selection of eyes 30A, 30B and 30C are presented on the screen 22 to be selected using the selection tick 26. The selected eyes 32 can be placed on selection, within the selective facial outline 28, either automatically in the position that the selective eyes 32 would normally occupy in a facial outline 28, or can be moved around by the user until they are in the satisfactory position.

Figure 2C:
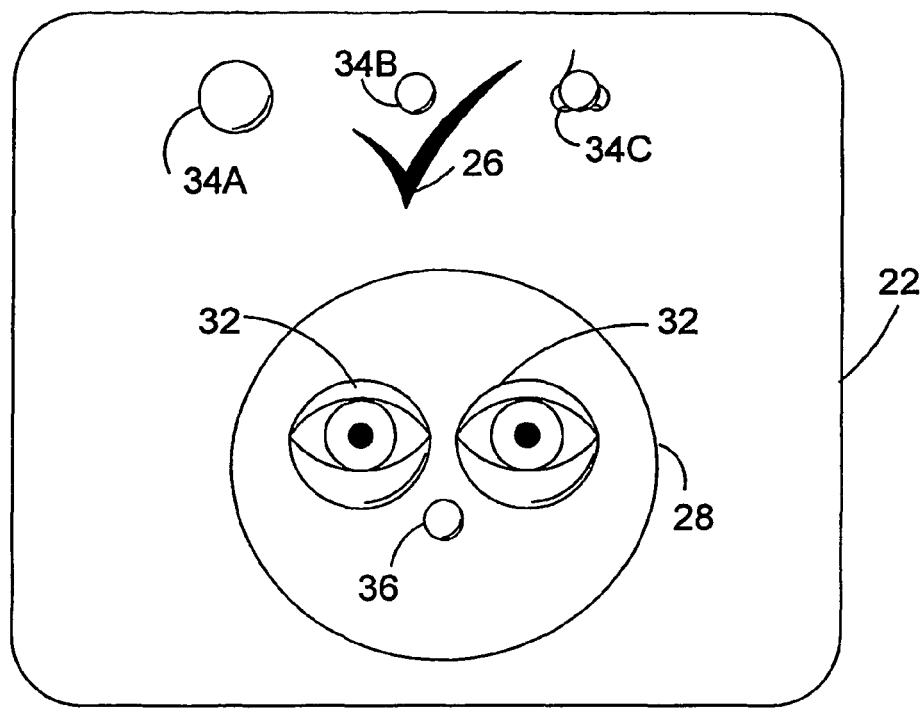

FIG. 2C shows a third stage in the generation in the facial image, where a selection of noses 34A, 34B and 34C are presented on the screen 22 to be selected using the selection tick 26 and placed within the selective facial outline 28, as before, either automatically in the position where the selected nose 36 would normally be positioned in the selected facial outline 28 or positioned in a user selectable spot.

Figure 2D:
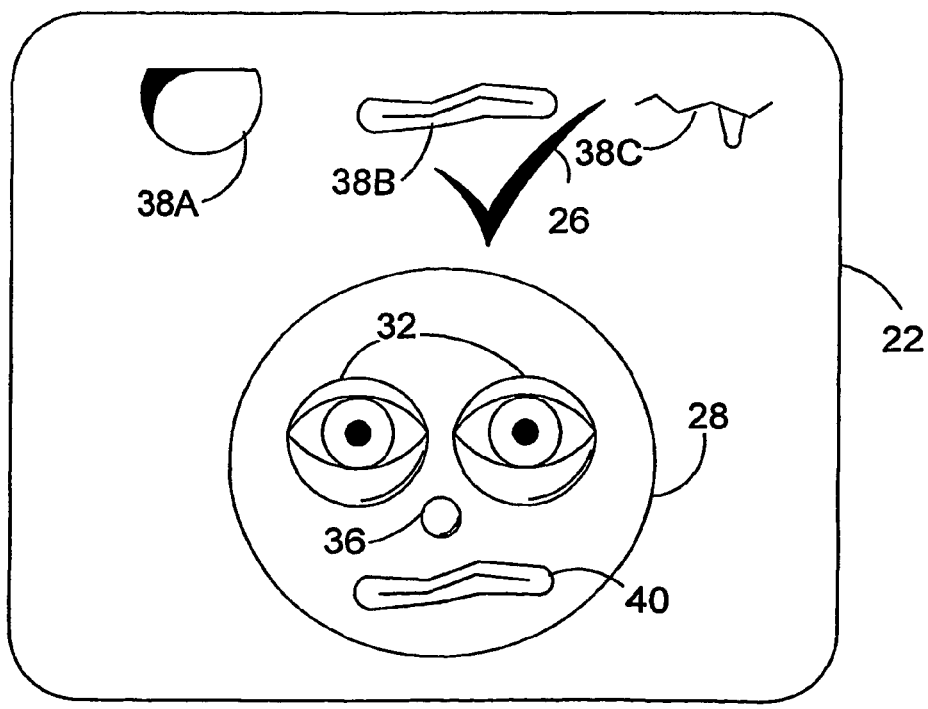

FIG. 2D shows a fourth stage in the possible generation of an image of a face, where the user is presented, in the screen 22, with a selection of possible mouths 38A, 38B and 38C. As before, the user uses the selection tick 26 to determine the selected mouth 40 and to position it within the selected facial outline 26.

Figure 2E:
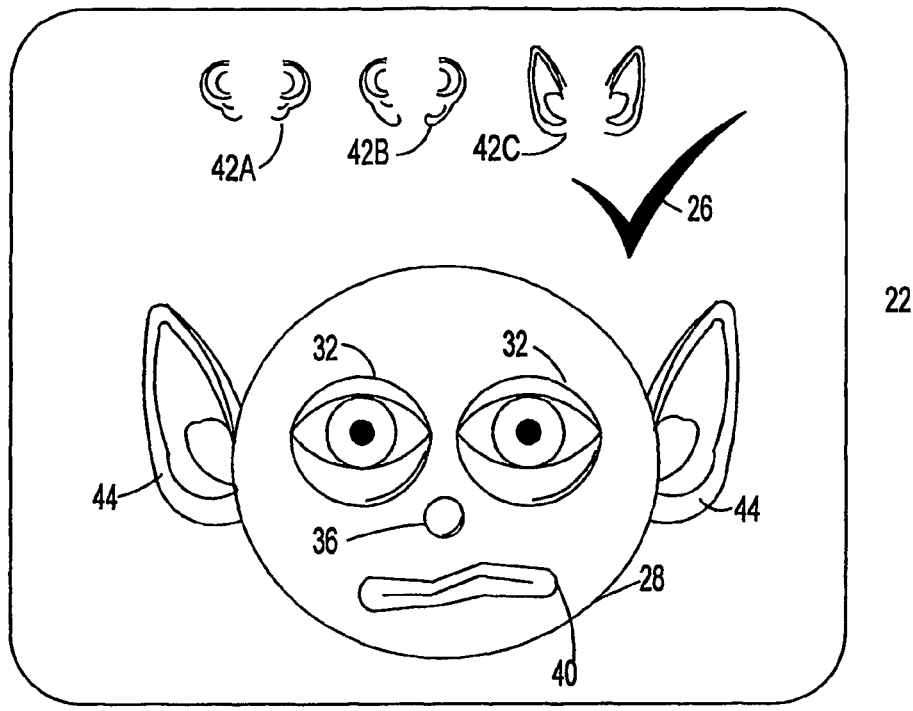

FIG. 2E shows a further stage in the possible construction of an image of face, where the user is presented, within the screen 22, with a selection of possible ears 42A, 42B and 42C. Once again the user employs the selection tick 26 to select for placement the selected ears 44 on the selected facial outline 28.

Figure 2F:
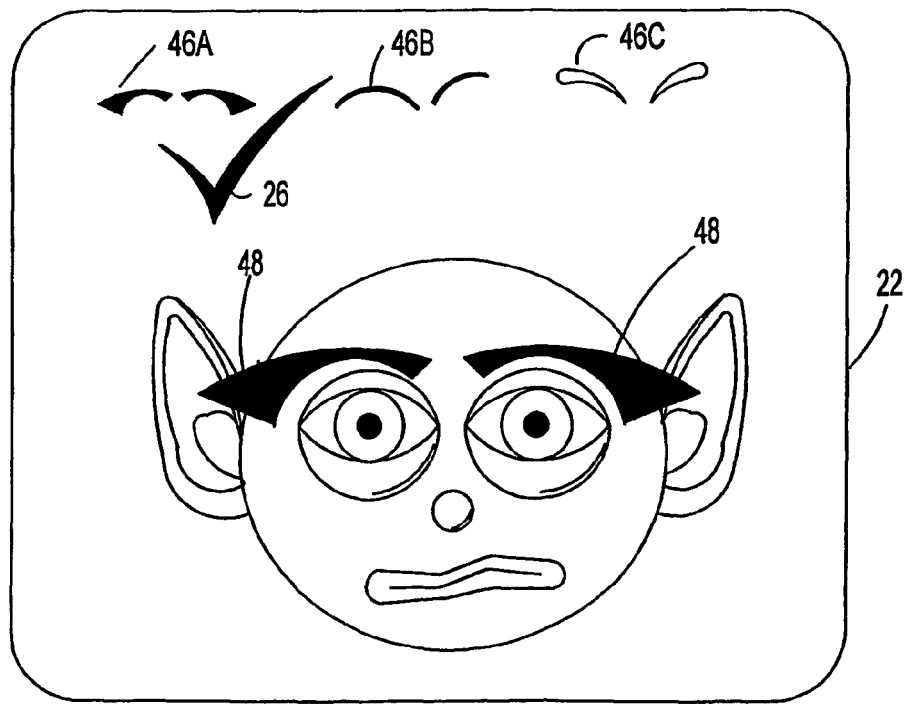

Finally, in this sequence, FIG. 2F shows selection from among a plurality of possible eyebrows 46A, 46B and 46C for the placement of the selected eyebrows 48 on the steadily growing image of a face.

FIGS. 2A to 2F are provided to illustrate the great diversity of images that can be constructed using a part-by-part method according to the present invention. While each screen 22, in this limited example, is shown with only an option of three selectable items, even on this narrow basis, and up to this stage, a total of eighty-one different faces can be constructed. If hair and hats are added, the possibility rises to seven hundred and twenty-nine different facial images. All this is without any other variations on appearance which are also applicable according to the present invention. In the prior art, each of these seven hundred and twenty-nine different images would have to be sent and stored as a separate entity. By comparison, in this very limited example, assuming the addition of the hair and hats, the entire data for seven hundred and twenty-nine different facial images can be found in just eighteen stored part images which can recalled from a memory and applied to the screen 22.

Figure 3:
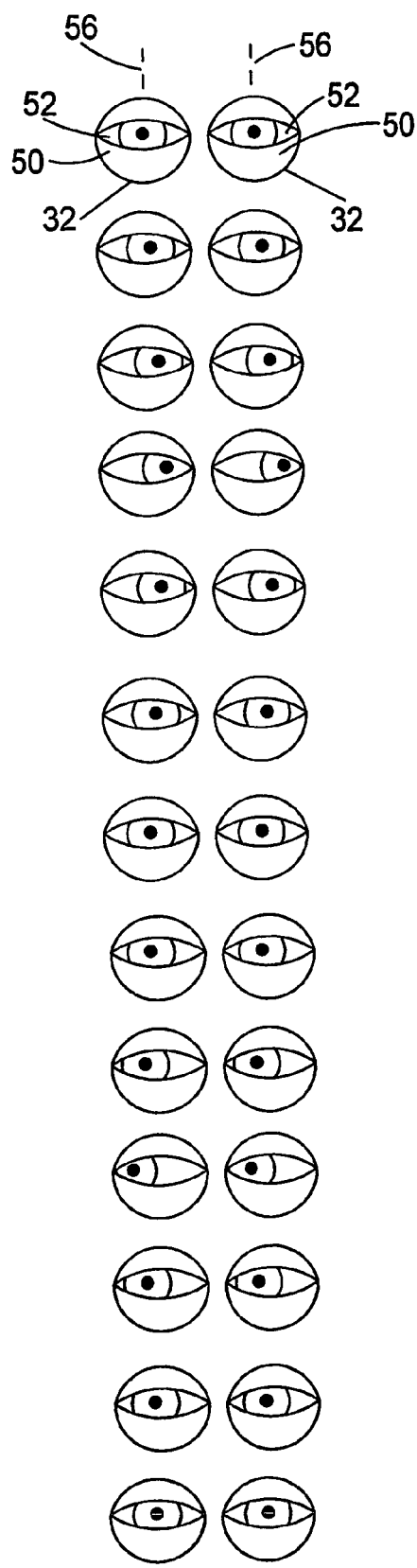
FIG. 3 is a continuous animation sequence, according to the present invention, reading from the top to the bottom, where a pair of eyes, commencing looking ahead, gaze to their left, centre, right and back to centre.

Attention is now drawn to FIG. 3, showing the effect that simple continuous animation can have upon an item, in this example, the selected eyes 32.

The image, stored in the memory for eyes, is in fact spherically symmetric. The eyelids 50, in this example, form a continuous fixed, spherically symmetric shell with a slit opening 52 through which the spherical eyes' surface 54 is visible. The spherical eye surface 54 is able to rotate about an axis of eye surface 56 so that the pupil and the iris can move within the slit opening 52. In the example given in FIG. 3, a movement has been specified where the spherical eye surface 54 swings from a straight ahead position first towards the observer's extreme right, back towards the observer's centre, towards the observer's extreme left, and back towards the centre. It is a continuous simple harmonic motion which gives the impression that the eyes are panning left and right. This is just one example of the manner in which a picture element may be given continuous animation. As will become clear in the later description, other continuous animations are possible.

Figure 4A:
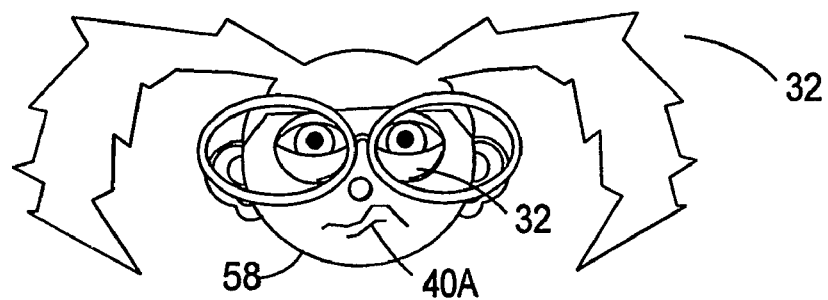
FIGS. 4A to 4D show the effects of substituting animation, where a facial expression runs through a sequence by means of replacement of one mouth by another on a sequential basis.
Figure 4B:
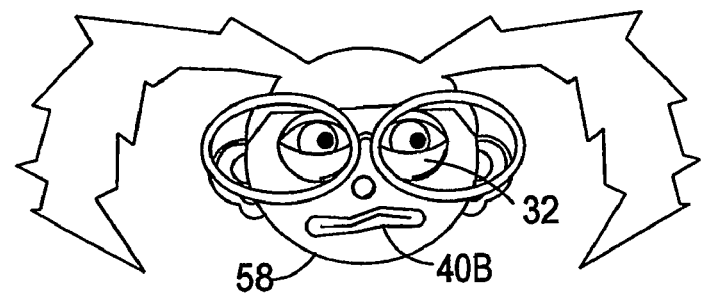
Figure 4C:
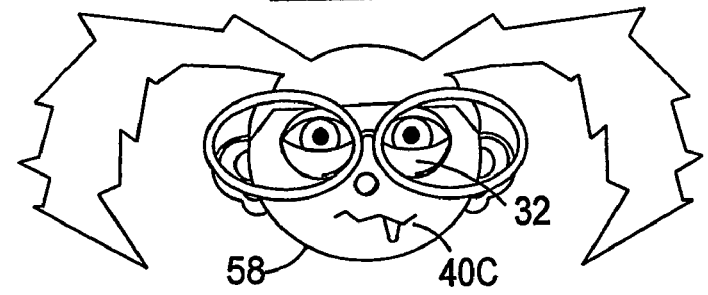
Figure 4D:
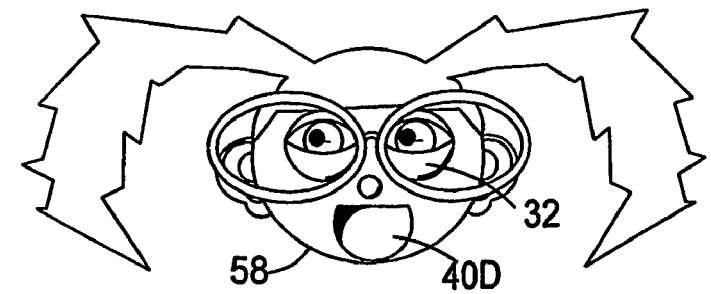
Figure 4E:
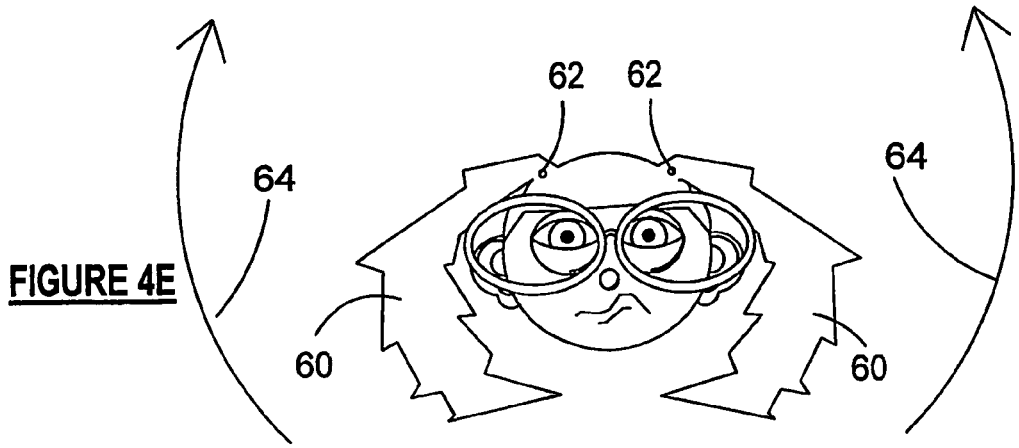
FIGS. 4E to 4H show the effect of altering the angle of tilt of a part to produce different appearances.
Figure 4F:
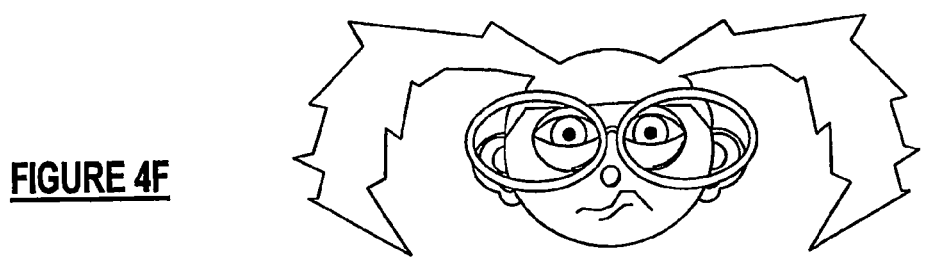
Figure 4G:
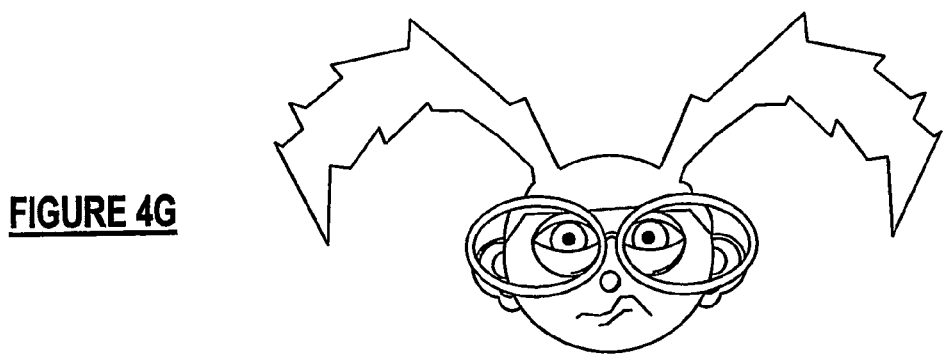
Figure 4H:
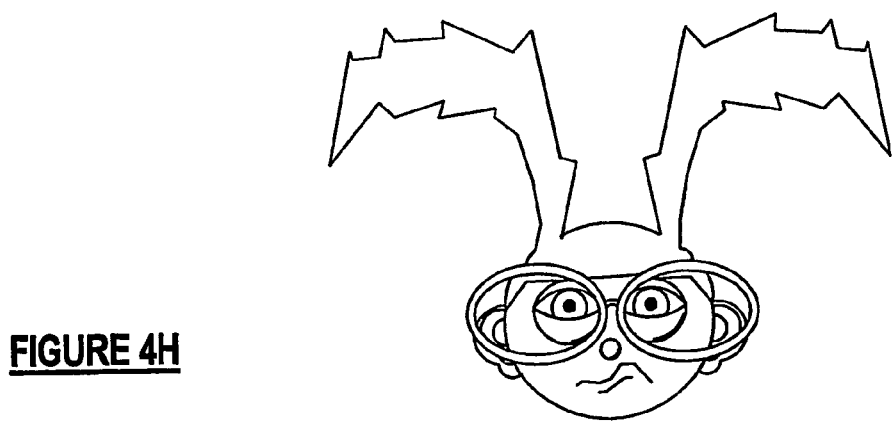

Attention is drawn to FIGS. 4A, 4B 4C and 4D which show substitution animation. The sequence, starting with FIG. 4A shows a range of different expression on a face 58 created by the simple expedient of substituting which selected mouth 40A, 40B, 40C and 40D is present, in what sequence, and for how long. It is also to be noted that in this sequence, the eyes 32 are seen to be casting about left and right. This can be achieved either by continuous animation as shown in FIG. 3, or by substitution animation where selected eyes 32 are substituted for each other, the selected eyes having a fixed stare in a particular direction.

Attention is drawn to FIGS. 4E, 4F, 4G and 4H showing how a simple angular rotation of a selected item can cause a radical difference in appearance. Here hair bunches 60 are given different selectable angular positions around their attachment points 62 (as indicated by arrows 64) to give either individual fixed images as shown in the individual FIGS. 4E, 4F, 4G and 4H or a substitution animation, or a continuous animation by continuously varying the angle of tilt, to express "a hair raising experience".

Figure 5A:
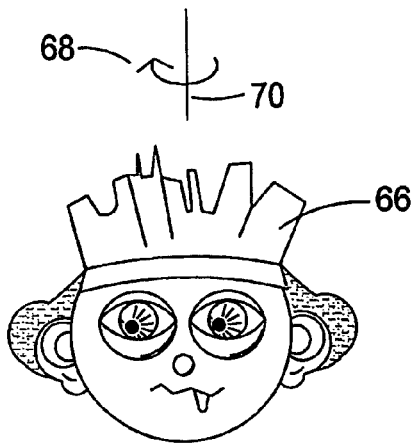
FIGS. 5A to 5C show how parts can be rotated to produce different types of animation.

Attention is drawn to FIG. 5A showing another form of animation, namely continuous rotation. In the example given, the headgear 66 on the image of the face can be caused to rotate as indicated by arrow 68, at a selectable angular velocity and in a selectable sense about axis 70 to give a pleasing and amusing effect.

Figure 5B:
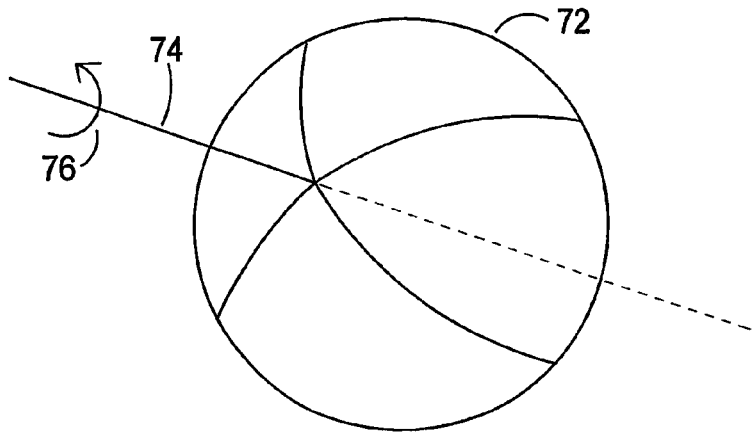

FIG. 5B shows another example of a sphere 72 rotating at a selectable angular velocity and selectable sense around directable axis 74 as indicated by arrow 76. Directable axis 74 can have its direction of pointing selected. Thus, the axis of rotation 74 of the sphere 72, or any other object to which this animation is applied, can point to wherever the user selects and, of itself, can have its own variation in direction of point.

Figure 5C:
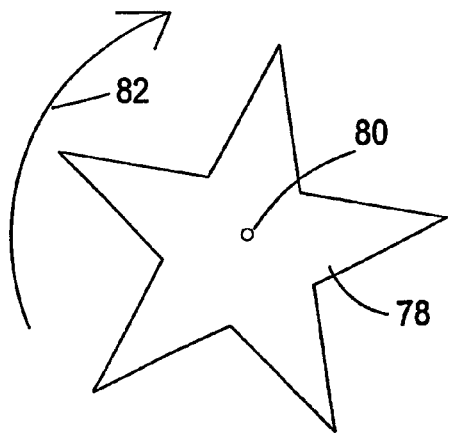

FIG. 5C shows how a decorative object such as a star 78 can be caused to rotate, in the plane of view, about a centre 80 of selectable position at a selectable angular velocity as indicated by arrow 82. This same form of animation can be applied to virtually any item or image which can be created within the compass of the present invention.

Figure 6:
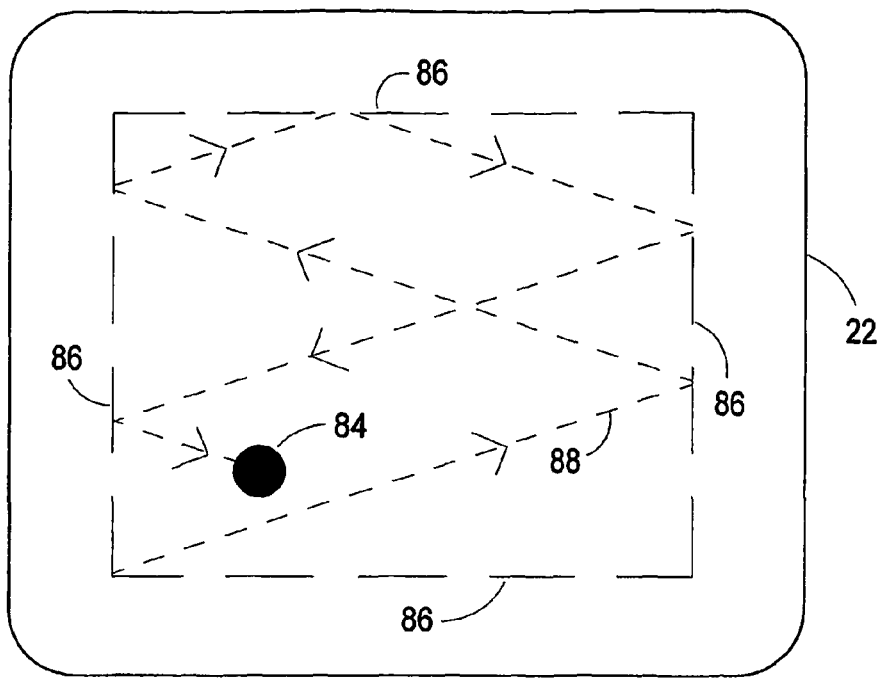
FIG. 6 shows how an object can be bounced around a screen to produce yet another type of animation.

FIG. 6 shows another form of animation. An object 84 is imparted with a selectable horizontal velocity and a selectable vertical velocity to bounce between boundaries 86 in selectable positions the screen 22, to follow a trajectory 84. The boundaries 86 may be made coincident with the screen of the screen 22, can have gaps sent therein so that the object 84 may come to bounce between the edge of the screen 22 and the other side of the boundary, or can be other than straight. The object 84 itself can be virtually anything and might, for example, be a bird or a other object of fancy placed to decorate the background to a scene by its movement.

So far, various simple examples have been given of images and effects which can be achieved according to the present invention.

It would be far too exhaustive to give an example of everything which can be done. It is therefore to be understood that the present invention encompasses any permutation or combination of all or some of the techniques hereinbefore and hereinafter described.

Figure 7:
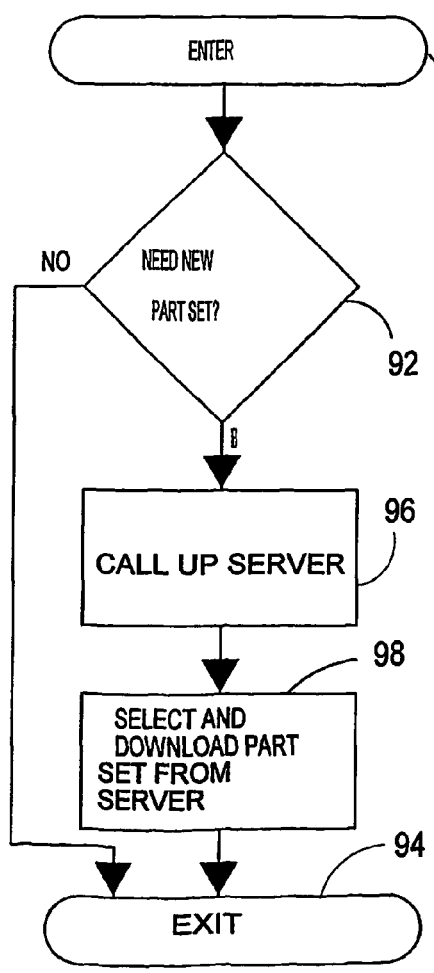
FIG. 7 is a flowchart showing how a mobile telephone, according to the present invention, if short of a part set for creation or reception of an image or animation, can obtain that part set from the server, otherwise shown in FIG. 1.

Attention is drawn to FIG. 7 showing a flow chart of how a mobile telephone 10 can commence to create scenes and images. While it is preferred that a set of parts is stored within the mobile telephone 10 in a non-volatile memory, this may not always be possible, and different sets of parts can exist.

So, from entry 90 a first test 92 detects whether or not the user or the automatic operation of the mobile telephone 10 requires the presence of a new part set in the memory of the mobile telephone 10. This may happen, for example, if an image is received which is not recognisable by its parts to the mobile telephone 10. Alternatively, the user of the mobile telephone 10 may wish to construct images from a different part set. If no new set of parts is required, the routine passes to an exit 94 with no new parts set being acquired. If, however, a new part set (set of parts) is required, a first operation 96 has the mobile telephone 10 call up the sever 18 (otherwise shown in FIG. 1) via the base station 12 and the terrestrial telephone network 14 to request the particular part set for the server 18. A second operation 98 then selects which part set is required and downloads that part set from the server 18. Thereafter the sequence of operations passes to exit 94 to continue with other things.

Figure 8:
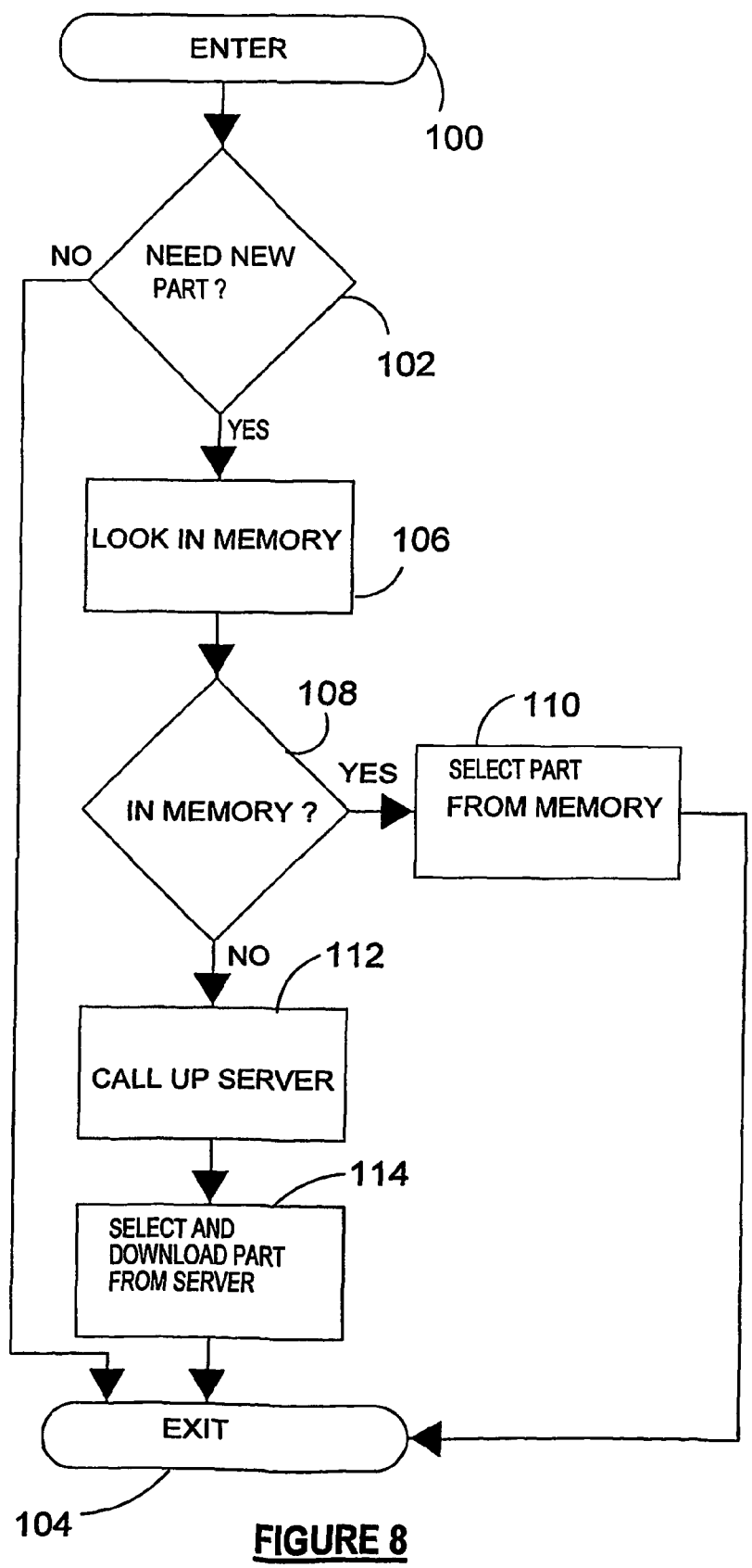
FIG. 8 is a flowchart showing how a mobile telephone, according to the present invention, if short of an individual set for creation or reception of an image or animation, can obtain that individual part from the server, otherwise shown in FIG. 1.

FIG. 8 shows what may occur whilst creating an image or scene. From entry 100 a second test 102 checks to see if a new part is required to complete or to continue to create an image or scene. If not, the operation terminates in exit 104 where the user of the mobile telephone 10 can continue in his creations of the image or scene. If, however, a new part is required, a third operation 106 looks in the memory of the mobile telephone 10 to find the required part. If a third test 108 finds that the required part is in the memory of the mobile telephone 10, a fourth operation 110 selects the required part from the memory and goes to the exit 104.

If the required part is not to be found in the memory of the mobile telephone 10, a fifth operation 112 calls up the sever 18 and a sixth operation 114 selects and downloads the part from the server 18 before passing to the exit 104. In this way, an individual, creating an image or scene on the mobile telephone 10, can obtain parts automatically and seamlessly. The same process of FIG. 8 can be applied when receiving an image or scene. If any particular part is missing, it can be obtained and used. This is a better alternative than another means, also within the present invention, where, if a particular nominated part is not present, another part will automatically be substituted.

Figure 9:
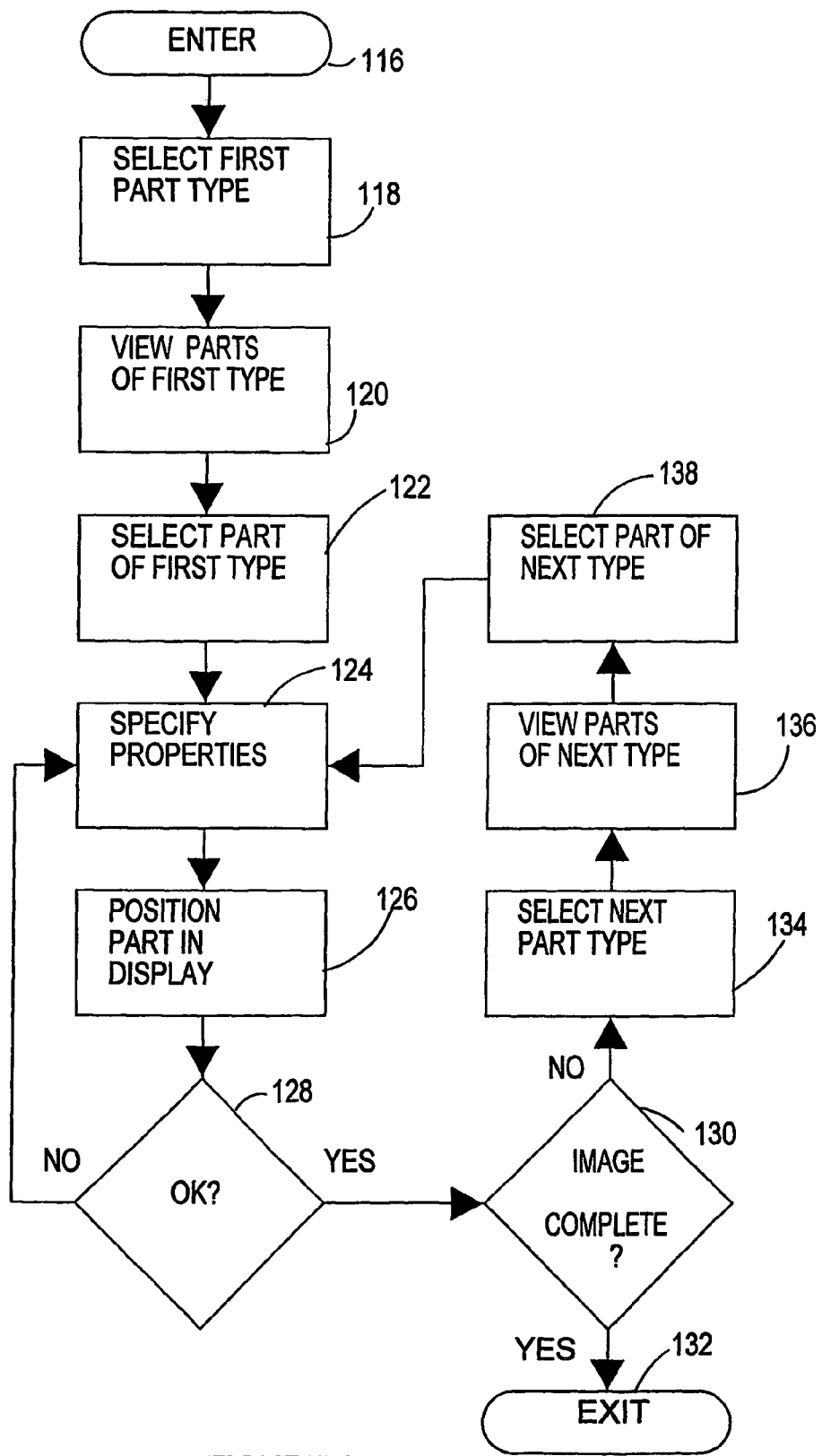
FIG. 9 is a flowchart showing one way in which an image/animation can be assembled.

Attention is drawn to FIG. 9 and to Table 1 (printed hereafter). FIG. 9 is a flow chart of the steps which are to be taken when creating an image or scene according to the present invention. Table 1 shows examples of different types of parts which can be used when creating an image or scene. Attention is also drawn to Table 2 listing some possible "properties" which can be used with the present invention.

From entry 116 a seventh operation 118 has the user of the mobile telephone 10 and the mobile telephone 10 co-operate to select a first part type. An array of possible part types is placed on, and possibly scrolled across, the screen 22. The user views the part types and selects one of the part types to be the general kind of part next to be placed upon the screen 22 in forming the image or scene. Having selected the first part type, an eighth operation 120 has the user of the mobile telephone 10 viewing all those different parts in the selected part type. A ninth operation 122 then has the user of the mobile telephone 10 selecting one of the parts of the first part type to be placed in the image or scene.

TABLE 1

| DIFFERENT TYPES OF PARTS | |
|---|---|
| TYPE OF PART | SELECTABLE PARTS |
| Face Part | Face outlines, Ears, Eyebrows, Hair, Eyes, Pupils, Mouths, Noses, Lips, Teeth, Tongues, Moles, Scars. |

TABLE 1-continued

| DIFFERENT TYPES OF PARTS | |
|---|---|
| TYPE OF PART | SELECTABLE PARTS |
| Face Furniture | Spectacles, Monocles, Headgear, Hair Ornaments, Jewellery, Eye Patches, Tattoos |
| Body Part | Torso, Arms, Legs, Hands, Feet, |
| Body Clothing | Upper body clothing, Lower body clothing, Shoes, Gloves, Scarves |
| Accoutrements | Skate boards, Roller Blades, Scooters, Roller Skates, Bicycle, Push Chair, Perambulator |
| Objects | Household items, Buildings, Computer equipment. |
| Shapes | Square, Circle, Polygon, Crescent Moon, Stars |
| Creatures | Cats, Dogs, Horses, Fish, Wildlife, Birds, African, Australian |

At this point attention is drawn to Table 1 which shows, by way of example, different types of parts which can be selected in the seventh operation 188. For example, face parts can include face outlines, ears, eyebrows, hair, eyes, pupils, mouths, noses, lips, teeth, tongues, moles, scars and so on as briefly described with reference to FIGS. 2A to 2F. Another type of part which could be selected is face furniture which could include spectacles, monocles, headgear, hair ornaments, jewellery, eye patches, tattoos, make-up and so on. Equally, body parts can form a type of part, including torso, arms, legs, hands, feet, to name but a few. Equally body clothing can form a type of part as can equipment, general types of objects such as household items, buildings, computer equipment, different geometric shapes such as squares, circles, polygons, crescent moon and stars, creatures such as cats, dogs, horses, fish, birds etc and, not shown in Table 1 but equally valid, invisible types of parts such as boundaries 86 shown in FIG. 6. The number of different types of part is limited only by the imagination of the compiler of an apparatus functioning under the present invention.

TABLE NO 2

| PROPERTIES |
|---|
| 1. Colour |
| 2. Texture |
| 3. Rendering |
| 4. Size |
| 5. Distance from Reference Plane |
| 6. X-axis position |
| 7. Y-Axis position |
| 8. Transparency |
| 9. Rotation Centre |
| 10. Rotation angle |
| 11. X-axis velocity |
| 12. Y-axis velocity |
| 13. Z-Axis velocity |
| 14. X-Axis Boundary |
| 15. Y = Axis Boundary |
| 16. Z-Axis Boundary |
| 17. Spin Axis First Angle |
| 18. Spin Axis Second Angle |
| 19. Spin Sense |
| 20. Angular Velocity |
| 21. Spin Axis Precession Y limit |
| 22. Spin Axis Precession X limit |
| 23. Spin Axis Precession rate |
| 24. Bounce at X Boundary Y/N |
| 25. X Coefficient of restitution |
| 26. Bounce at Y Boundary Y/N |
| 27. Y coefficient of Restitution |

TABLE NO 2-continued

PROPERTIES

28. Bounce at Z boundary Y/N
29. Z coefficient of restitution
30. Viewpoint
31. Blink Timeslots
32. Blink Rate
33. Group
34. Un-group Returning to FIG. 9, having selected the particular part in the ninth operation 122, a tenth operation 124 specifies the properties of that part. Table 2 gives examples of different properties that can be attributed to a part of the present invention. Table 2 shows only a limited number of examples, and is not exhaustive.

Properties such as colour and texture are self explanatory. These are to be found in many graphic creation applications. Rendering is the placing of an image carrying skin over the object. Size is self-explanatory. Distance from the reference plane is of importance when determining which item in a scene or image will obscure another. X axis position and Y axis position indicate the fixed position, or start position for animation, on the screen 22. Transparency determines how much of images or objects behind a particular part will be obscured. Rotation centre specifies the centre 80 for continuous rotation and obliquely all the attachment points 62 (FIGS. 4E to 4H). X-axis velocity Y-axis velocity are explained in FIG. 6. Z-axis velocity is also self explanatory. The X, y and Z axis boundaries are explained in FIG. 6. The spin axis first angle and the spin axis second angle, the spin sense and the angular velocity are all explained with regard to FIG. 5B where the directable axis 74 has its direction of point defined and the object (part) is spun. Spin axis precession Y limit and spin axis procession X limit are self explanatory, allowing the directable axis 74 to move around to allow different views of the sphere 72 (or other objects) to be viewed over time. Items 24, 25, 26 and 27 define whether or not an object will bounce when it hits a boundary 86.

Alternatively, the object can bounce from the sides of the screen 22. The coefficient of restitution defines with what proportion of its impact velocity the object is reflected. With a coefficient of restitution of 100%, the object continues moving for ever at a constant speed. With a coefficient of restitution of less than 100%, the object gradually slows down exponentially.

Items 28 and 29 define whether or not the object will bounce towards and away from the screen. Item 30 is a viewpoint. This permits the screen 22 to be placed in a different position.

Items 31 and 32 are used in substitution animation. An object can be placed in a particular blink timeslot. For example, up to 12 timeslots can be allocated. If an object is to be visible for one-third of the time, it will be allocated four adjacent timeslots.

The blink rate determines at what speed substitution animation is to proceed. With a high enough blink rate, and images which form a movement sequence, it is possible to create continuous animation, in real time, which repeats every time the blink timeslots recycle.

Items 33 and 34, grouping and ungrouping, simply allow objects and items to be associated with one another so that they are scaled, moved, blinked on and off etc. together. Ungrouping breaks this association.

The properties defined in Table 2 are given only by way of example. The present invention encompasses smaller sets or larger sets of properties, each of which can be selected and adjusted, according to the requirements of the system.

Turning attention to FIG. 9, once the properties have been specified by the tenth operation 124, an eleventh operation 126 allows the user to use the buttons on the mobile telephone 10 to position the particular item in the display 22. If a fourth test 128 detects that the user is satisfied, control passes to a fifth test 130. If the fourth test 128 detects that the user is not satisfied with the placed part, control returns to the tenth operation 124 where the properties can be re-specified.

The fifth test 130 checks to see if the image is complete. If the image is complete, the procedure terminates in exit 132. If the image or scene is not complete, a twelfth operation 134 has the user select a new part type, a thirteen operation 136 has the user view the parts of the new type, and a fourteenth operation 138 has the user select a part of the new type before passing control back to the tenth operation 124 for the user to define the properties of the newly selected part.

Figure 10:
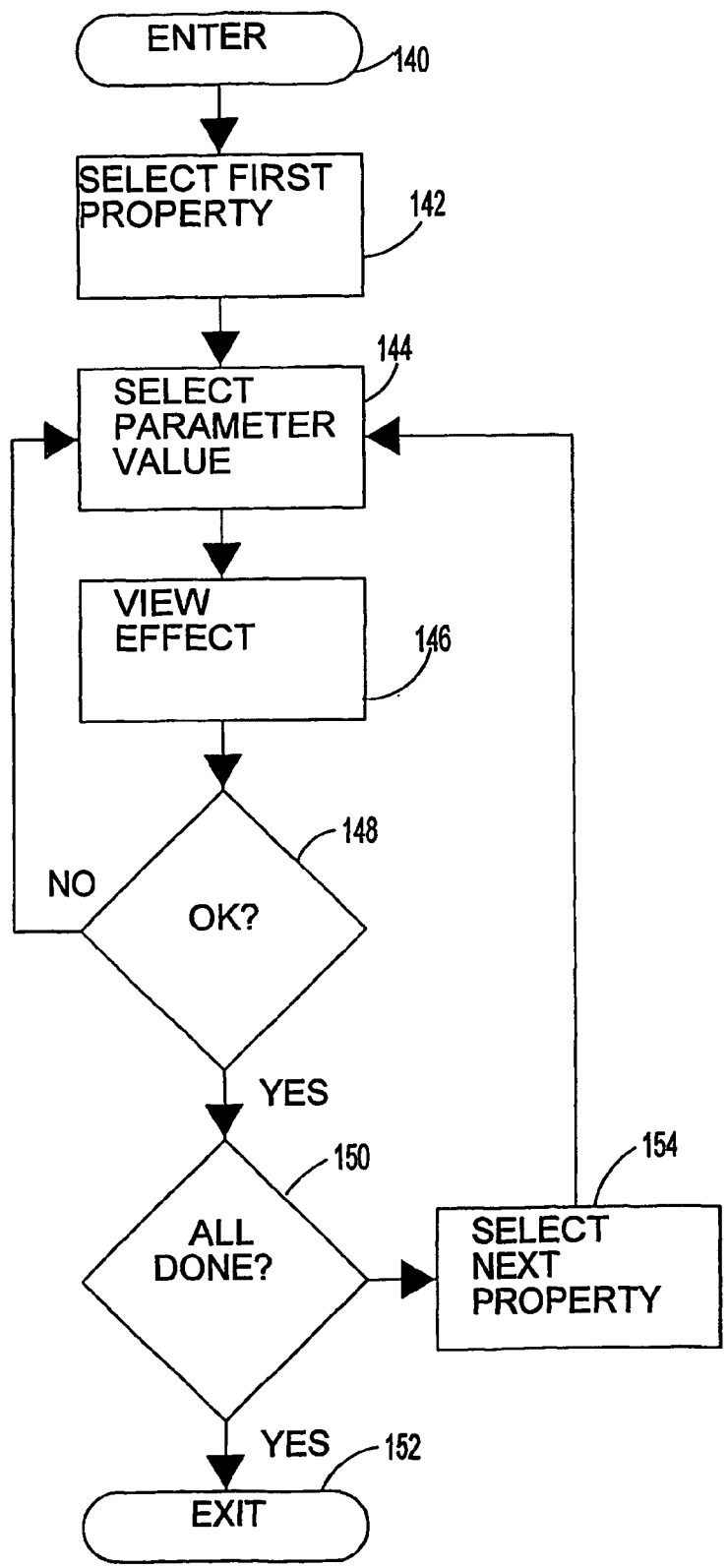
FIG. 10 is a flowchart illustrating how the "specify properties" operation of FIG. 9 can be achieved.

Attention is next drawn to FIG. 10, which is a flow chart showing how the many different properties a part may require are selected and applied. The flow chart of FIG. 10 corresponds to the tenth operation 124 shown in FIG. 9.

From entry 140 a sixteenth operation 142 has the user co-operate with mobile telephone 10 to select the first property to be applied. This could be any of the properties suggested in Table 3. For example, the user could select the texture. A sixteenth operation 144 then has the user select a parameter value. The effect of the property and its parameter value is viewed in a seventeenth operation 146. If a sixth test 148 finds that the user is not satisfied with the value he has selected, control is passed back to the sixteenth operation 144. If the viewed effect of the seventeenth operation 146 is satisfactory, control passes to a seventh test 150 which checks to see if all the properties have been selected for the particular part in question. If they have, the routine proceeds to exit 152. If they have not, control passes to an eighteenth operation 154 which allows the user to select the next property to be applied to be part in question. Control then passes back to the sixteenth operation 144 where the user can once again select parameter values.

The procedure of FIG. 10 allows the user to select as few or as many properties for a part as is required, and to adjust the effect of the parameter values until a satisfactory result is achieved on the screen 22.

Attention is drawn to FIG. 11, FIG. 12 and Table 4. Together they explain the manner in which a static or animated image can be sent from one mobile telephone 10 to another mobile telephone 20 using a simple coding scheme which, in this example, is a simple text message.

Because of the tremendous variety which can be achieved using a relatively small number of parts, properties and property values, it is feasible to send a complex image with or without animation from one mobile telephone 10 to another mobile telephone 20 using a simple text message structure. In the example chosen, and described in Table 4, only upper case letters have been used. Giving twenty-five different values to each part of the message allows, in just ten characters, over $10^{14}$ different possibilities. If the upper case and lower case letters are used, over $10^{17}$ different combinations are possible. If letters are abandoned, and an eight-bit byte is adopted as the unit, the number of possibilities rises to over $10^{24}$ in just eight-bit bytes. Under the terms of the present invention, any form of coding can be used. The upper case letters example has been chosen for simplicity of explanation. The use of a text message using ordinary letters has been chosen because the technology already exists within mobile telephones 10 and because it is then possible for a user to memorise a character string which can then be keyed in, manually if necessary, and sent to another mobile telephone 10.

Attention is drawn in particular to FIG. 11, showing how a mobile telephone 10 constructs a text message sending an image.

From entry 156 an eighteenth test 158 determines whether or not the user wishes to send an image. If the user does not wish to send an image, a nineteenth operation 160 continues with whatever other and ordinary operations the mobile telephone 10 usually conducts. If the user does wish to send an image, a twentieth operation 162 recalls, from a memory within the mobile telephone 10, the part identifiers for the different parts that occur in the image. A twenty-first operation 164 then recalls, from the memory in the mobile telephone 10, the properties associated with each part recalled in the twentieth operation 162 and a twenty-second operation 166 matches up each part and their respective properties. A twenty-third operation 168 then forms a concatenated queue of characters, in the correct order, representing the individual parts and their selected properties. This concatenated queue of part identifiers and property selectors is sent, as a simple text message, to the receiving mobile telephone 10, in a twenty-fourth operation 170. The image sending process then terminates in an exit 172.

Attention is next drawn to FIG. 12, showing the manner in which a receiving mobile telephone 10 can receive and reconstruct an image sent from a sending mobile telephone 10.

From entry 174 a twenty-fifth operation 176 receives the image representative text message and can store it, in much the same way that an ordinary text message is stored. Either immediately, or at a later time determined by the user of the receiving mobile telephone 10, a twenty-sixth operation 178 identifies the first part to be included in the scene represented by the text message. A twenty-seventh operation 180 then retrieves that identified part from the memory of the receiving mobile telephone 10. It is to be recalled that both the sending mobile telephone 10 and the receiving mobile telephone 10 have, stored in their memories, a library of parts which can be called forth by identifiers, manipulated, adapted, and provided for the display on the screen 22.

Thereafter a twenty-eighth operation 182 determines the properties to be applied to the identified part and applies those properties thereto. A twenty-ninth operation 184 then places the identified part, with its properties, on the display screen 22.

A ninth test 186 checks to see if there are any remaining part of the received message from the twenty-fifth operation 176 which still need to be processed. If there are, a thirtieth operation 190 identifies the next part in the received and stored text message, and passes control back to the twenty-seventh operation 180 so that the next part may be qualified by application of its properties and its placement on the display screen 22.

When the ninth test 186 detects that the final part of the received and stored text message from the twenty-fifth operation 176 has been processed, a thirty-first operation 190 starts up any animation which has been included in the image, and proceeds to exit 192.

Not shown on FIG. 12 is the possibility of the receiving mobile telephone 10 storing the reconstructed image in a separate memory. In fact, this is not necessary, since the received text message is already stored in the twenty-fifth operation 176 and can be otherwise stored to be recalled at any time.

TABLE 3

Exemplary Scheme To Send Images By Text Message

| PURPOSE OF ITEM IN TEXT MESSAGE | NATURE OF ITEM IN TEXT MESSAGE |
|---|---|
| 1. Graphic delimiter (start) | ** |
| 2. Part Type Identifier | One of A-Z (26 different types) |
| 3. Part Identifier | One of A-Z (26 different parts) |
| 4. Position Identifier | One of A-Z (26 different places) |
| 5. Property delimiter (start) | #* |
| 6. Property identifier | One of A-Z (26 different types) |
| 7. Property value | One of A-Z (26 possible values) |
| 8. Property identifier | One of A-Z (26 different types) |
| 9. Property Value | One of A-Z (26 possible values) |
| 10. Property delimiter (end) | *# |
| 11. Part Type Identifier | One of A-Z (26 different types) |
| 12. Part Identifier | One of A-Z (26 different parts) |
| 13. Position Identifier | One of A-Z (26 different places) |
| 14. Property Delimiter (start) | #* |
| 15. Property Identifier | One of A-Z (26 different types) |
| 16. Property Value | One of A-Z (26 possible values) |
| 17. Property Delimiter (end) | *# |
| 18. Graphic Delimiter | ## |

Attention is drawn to Table 3, showing one example of a coding scheme whereby an image could be sent as a text message.

The left hand column of Table 3 shows the purpose of an item in a text message and the right hand column shows possible exemplary representations of what that item could be.

The first required element is a graphic delimiter. It is necessary to indicate that an item, being received, is an image. In this example, a double asterisk, never occurring in normal text messages, is chosen as the graphic delimiter.

The next element to be conveyed is a part type delimiter. This is intended to indicate that a particular type of part (see Table 1) is about to be indicated. The third element is a part identifier. This identifies which one of a particular type of part is to be seen in the image. A position identifier indicates where, on the screen 22, the selected part is to be positioned. The second, third and fourth elements in Table 3 are each, in this example, designated as having one of the characters A to Z as the indicator. Even in the restricted range of this example, this permits over 17,000 different combinations of sorts of parts and positions.

Having selected a part and where it is to be on the screen 22, the next thing to determine is what properties that part should have. A property delimiter is chosen, in this example, to be another combination unlikely in the normal text message, the hash symbol followed by the asterisk.

In this example, in Table 3, the sixth and seventh elements are a property identifier, to identify which property is to be selected, and a value for that property (earlier called parameters). As many different properties can be selected as are possible for that part. As an example, in Table 3, the eighth and ninth elements are a further property identifier followed by a further property value. As many pairs of property identifiers and property values as are necessary can be included. The property denomination process is terminated in a property delimiter for the end of the properties, in this example chosen as the asterisk followed by the hash.

In the example of Table 3, another part type identifier follows the property delimiter for the end of the properties. This is indicative of the fact that more than one part can be sent in the text message. The text message comprises a graphic delimiter called the start (**), a sequence of part type identifier followed by part identifier, position identifier and property identifiers, to be followed by another part type identifier and another part. This process continues until all the parts and all their properties have been included in the text message. When it is the end of the image representative text message, a graphic delimiter (item 18 in Table 3) is sent to show that the image representative text message is at an end. Once again, a combination of symbols (##) which is unlikely to occur in a normal text message, is chosen.

Table 3, of course, is just an example. Many other schemes of symbols and ordering of identifiers would also work and would also fall within the present invention.

It is to be appreciated that more complex scenes would require longer text messages.

The present invention has been described by way of an example relating to mobile telephones 10. As earlier stated, it is to be appreciated that the present invention can be applied to any system or apparatus where an image can be sent for display on a screen.

Figures 13A, 13B:
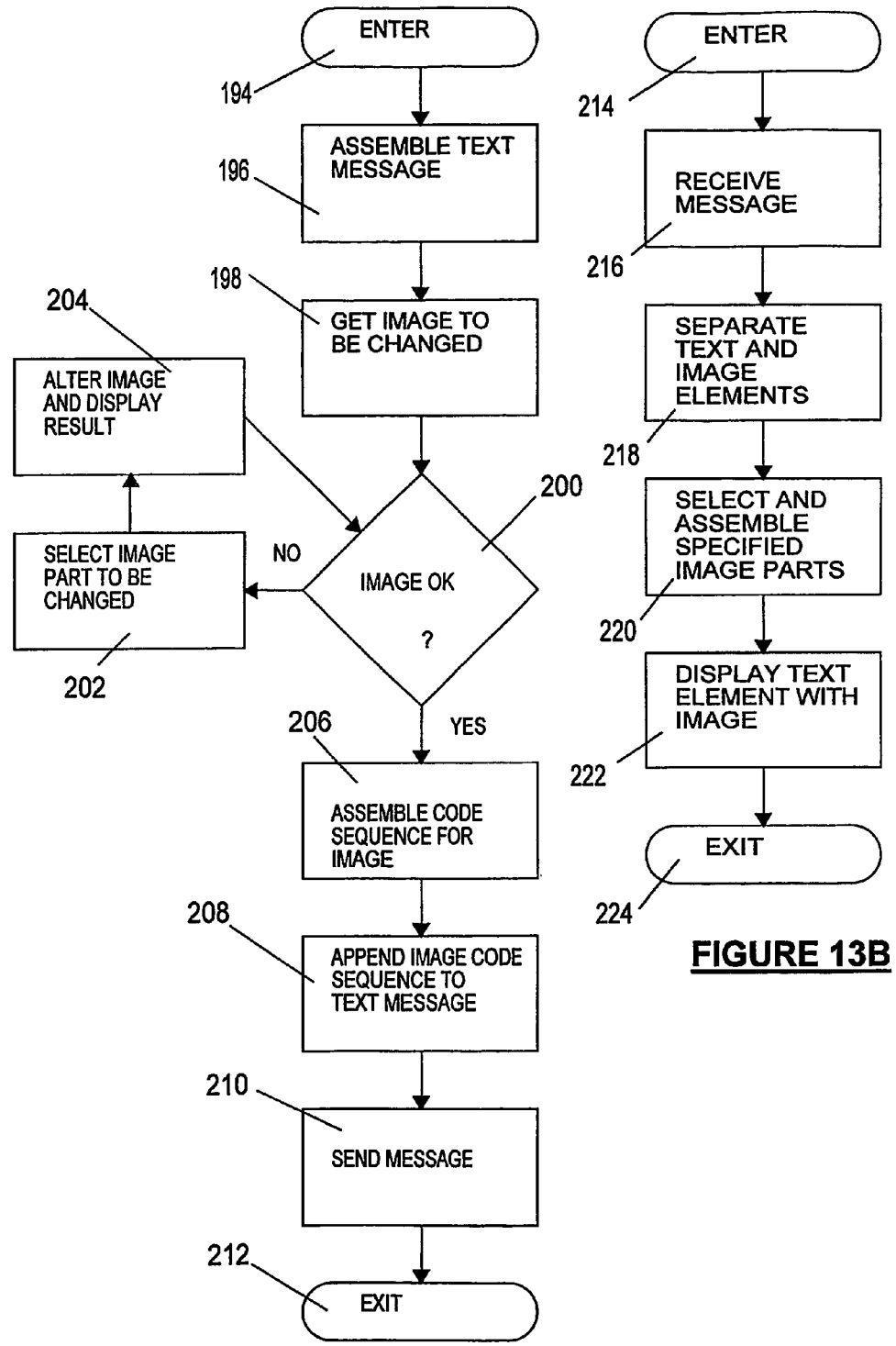
FIGS. 13A and 13B are flowcharts showing activities of an embodiment of the present disclosure.

Attention is drawn to FIGS. 13A and 13B which show, respectively, the activities of a sending device, such as a mobile telephone, when employing the present invention as part of a text messaging service, and the activities of a receiving device, such as a mobile telephone.

Attention is first drawn to FIG. 13A. From entry 194 a thirty-second operation 196 has the mobile telephone 10, 20 assemble a text message according to the methods and usages already well known in the art. Thereafter, a thirty-third operation 198 selects and displays an image which can be changed for transmission. This is an alternative, within the invention, to the assembly process shown in FIGS. 2A to 2F. Instead of

TABLE 4

POSSIBLE EXEMPLARY PICTURES AND
ANIMATIONS SENT BY TEXT MESSAGE

| EXEMPLARY TEXT MESSAGE | POSSIBLE MEANING |
| --- | --- |
| 1)<br>**AD#*GMPD*#BC#*GMANPW*### | **(start picture)A(select face) D(Long oval face) #*(with properties) G(position) M(centre screen) P(shade) D(dark) *#(end of properties) B(select eyebrows) C(bushy eyebrows) #*(with properties) G(position) M(centre screen) A(tilt Angle) N(just above horizontal) P(shade) W(light) *#(end of properties) ##(end of picture) |
| 2)<br>**GS#*GAXDYWRA*#GC#*GZXWYARA*### | **(start picture) G(select a geometric object) S(a star) #*(with properties) G(position) A(bottom left of screen) X(X-Axis velocity) D(quite slow) Y(Y-Axis velocity) W(quite high) R(coefficient of restitution on rebounding from edge of screen) A(100%) *#(end of properties) G(select geometric object) C(a sphere) #* (with properties) G(position) Z(top right of screen) X(X-Axis velocity) W(quite high) Y(Y-Axis velocity) D(quite low) R(coefficient of restitution when rebounding from edge of screen) A(100%) *#(end of properties) ## (end of picture) |

Finally, attention is drawn to Table 4, showing some exemplary text messages according to the scheme of Table 3. The values of the letters have been arbitrarily chosen to provide an exemplary narrative. In the first example, a long, oval, dark shaded face has been placed in the centre of the screen 22 and has had slightly tilted, bushy, light eyebrows placed thereon. This is an example of a static image. In the second example, a star, starting at the bottom left of the screen, with a slow X-axis velocity and a high Y-axis velocity rebounds from the edge of the screen with 100% coefficient of restitution while, at the same time, a sphere, starting at the top, right hand side of the screen with a high X-axis velocity and a low Y-axis velocity and a 100% coefficient of restitution also bounces from the boundary of the screen 22. This is an example of a simple animation.

starting with a blank and filling it in, a complete image is presented and can be changed. For example, the colour of the hair, should the image be a face, the general demeanour and so on can be altered. A tenth test 200 then checks to see if the mobile telephone 10, 20 user is content to send that image. If some modification is to be applied, a thirty-fourth operation 202 selects which part of the image, currently displayed, is to be changed. A thirty-fifth operation 204 then changes the selected image part, displays the result, and passes control back to the tenth test 200.

In the example shown, it is preferred, but by no means necessary, that the thirty-third operation 198 recalls from memory an image of a face in a default mode. The user, in the thirty-fourth operation 202, then has the choice, in this example, to select hair, glasses, ears, mouth, or animation.

Each one of these elements may be selected within a limited range. The reason for the limitation on the range will later become apparent. The face selected by the thirty-third operation 198 is a three-dimensional face. When an image element is selected, in the thirty-fourth operation 202, the user is able to cycle through a number of settings for that image part. For example, if he or she is selecting a mouth, it can be selected to be happy, sad, or angry. This is achieved by using, in this example, left and right navigation keys on the face of the mobile telephone 10, 20. The assembled image, when the tenth test 200 detects that the user of the mobile telephone is content to send that image, can store the image for later use.

Assembly of the image, in this example, is part of a message creation process. The thirty-second operation 196 has been shown to precede the image creation of the thirty-third operation 198 through to the thirty-fifth operation 204. It is envisaged, within the invention, that the orders in which the text and the image are created can be exchanged. It is also envisaged that when the thirty-third operation 198 calls forth a standard image, it may be displayed on the screen 22 together with the blank or a previous text message also in view which can be modified before, after, or as well as the assembled image (in this case, a face). When the caption button on the mobile telephone 10, 20 is pressed, the caption box below the face, in this example of the invention, expands to fill the screen and becomes editable to allow the user to create or update the current caption. Again, in this example, the short message service limit of 160 characters is slightly reduced to accommodate the image in a manner which will become clear. Thus, the embodiment shown in FIG. 13A should remain compatible with all existing short message services. A non-enabled machine simply will reproduce image representative characters in their raw state.

Once the tenth test 200 determines that the user of the mobile telephone 10, 20 is content with the text message and its associated image, a thirty-sixth operation 206 assembles the code sequence for the image. This is a short sequence of ASCII characters which can be used by a suitably enabled and programmed receiving mobile telephone 10, 20 to recreate the image approved by the tenth test 200 when it is received. The assembled code sequence is, for preference in this example, illustrated by Tables 1, 2 and 3.

However, the set is more limited than is suggested by these tables. In fact, the set is reminiscent of a face as shown in FIGS. 2A to 2F.

The number of additional characters needed to convey the selected image is remarkably small because of a compression mode. The compression mode means that the permutations and combinations are compressed into the minimum number of representative characters. In the example given there are, for the sake of argument, three different selections which may be chosen for each selected image part. This produces, given the five selectable image parts of hair, glasses, ear, mouth and (not strictly a part) animation, a total of 243 ($3^5$) different permutations and combinations. Given that the simple alphabet (let us say, for the sake of argument, strictly lower case) allows for twenty-six variations, and that excludes all numbers and upper case characters and punctuation, it can be seen that two letters can convey $26^2$ different permutations and combinations of elements, that is 676 different variations. Thus, the thirty-sixth operation 206 need assemble only a two character code to convey the entirety of the image. A thirty-seventh operation 208 then appends the image representative code to the assembled text message. For preference, the image representative code sequence is added to the end of the text message. It can, of course, be appended anywhere in the text message. It is preferred that the image representative code sequence is appended as the last two characters in the text message, since this obviates the need to include a graphic delimiter as illustrated by Table 3. It is automatic that the last two characters can be a graphic representative code sequence. The present invention, of course, also permits that, at the cost of an overhead of just one or two characters, a graphic delimiter, (item 1 on Table 3) can be transmitted. Of course, since it is the last so many bits that are the image representative code, there is no need to send a graphic delimiter at all (item 18 on Table 3).

The overall possible length of a text message is reduced by the size of the code sequence for the image so that the overall length of the text message and image representative sequence does not exceed the normal system limit for a normal text message.

Having assembled the message to be sent, a thirty-eighth operation 210 sends the message in the normal way and passes control to exit 212. Attention is next drawn to FIG. 13B, a flowchart showing the behaviour of a mobile telephone 10, 20 when receiving a message sent by a mobile telephone operating as illustrated and described with reference to FIG. 13A.

From entry 214, a thirty-ninth operation 216 has the mobile telephone 10,20 receive the message in the normal manner that a short message service message is received. Control then passes to a fortieth operation 218. The handover of control to the fortieth operation can be immediate or can wait until the received message is viewed by the user of the receiving mobile telephone 10, 20. The fortieth operation 218 separates the text and the image elements. In the present example, this involves isolating the last few bits of the message, should a graphics delimiter be present, as the image representative code sequence. A forty-first operation 220 then assembles the specified image parts to create an image according to the image code sequence. A forty-second operation 222 then displays the text element with the reconstructed image until the user decides no longer to view the message and proceeds to exit 224.

Attention is finally drawn to FIG. 14, showing how two letters, in lower case, can be used, as earlier described, to represent 676 different conditions, starting with one represented by the code aa and ending with 676 represented by the code zz. The codes are allocated by creating a table of every permutation and combination that the image can assume, and allocating one of the numbered squares or states to each combination.

Attention is drawn to FIG. 15, showing one way in which the compacted sending code may be utilised in the embodiments of FIGS. 13A and 13B. The left hand column is a column of all of the states of the five different elements of the image which can be modified. The drawing shows all of the 243 different states which can be occupied by the image. Zero is a first of the selectable states. Two is a second of the selectable states. Three is a third of the selectable states.

The middle column shows the number of the square, in FIG. 14, which is allocated to each state. This ranges from 1 all the way down to 243. The right hand column shows the combination of two letters which is represented by the square of the number in the middle column. These all range from aa to ii. This is the process used by the thirty-sixth operation 206 in a forward direction starting from the left hand columns and ending with the right hand column, and by the forty-first operation 220 starting with the right hand column and ending with the left hand columns. This process is stored within the memory of the portable telephones 10, 20.

While the different states have been simply packed from one end in the diagram of FIG. 14, it is to be appreciated that the states can be distributed in any manner which can be memorised by the mobile telephones 10, 20 across the entirety of the 676 possible two-letter states.

The invention claimed is:

1. A method, comprising:
a wireless communication device receiving input indicative of:
    a set of part images;
    positions to be occupied in an animated image for one or more part images in said set of part images; and
    at least one movement parameter for at least one part image in said set of part images;
the wireless communication device creating a text message that includes an image representative code sequence, different portions of which specify:
    a first set of characters indicative of the at least one part image;
    a second set of characters indicative of an initial position for the at least one part image; and
    a third set of characters indicative of the at least one movement parameter for the at least one part image;
    wherein the text message has a character limit, and wherein the text message is usable by a device receiving the text message to display motion of the at least one part image from the initial position along a trajectory according to the first, second, and third sets of characters; and
the wireless communication device sending the text message.

2. The method according to claim 1, wherein the third set of characters is indicative of an angular velocity.

3. The method according to claim 1, wherein the text message is a short message service message, and wherein at least one of the first, second, and third sets of characters is one character long.

4. The method according to claim 1, wherein the motion of the at least one part image includes changing direction to simulate bouncing from a boundary.

5. The method according to claim 1, wherein the third set of characters is indicative of an angular velocity and a linear velocity.

6. The method according to claim 1, wherein the text message further includes text elements usable by the device receiving the text message to display text, and wherein a possible character length of the text elements is reduced by a character length of the image representative code sequence such that an overall character length of the text message does not exceed the character limit.

7. The method according to claim 1, wherein the wireless communication device comprises a mobile telephone.

8. The method according to claim 1, wherein the wireless communication device comprises a personal digital assistant.

9. The method according to claim 1, wherein the wireless communication device sending the text message includes sending the text message to at least one of a computer, a personal digital assistant, and a mobile telephone.

10. A method, comprising:
a wireless communication device receiving a text message that has a character limit, wherein the text message includes an image representative code sequence, different portions of which specify:
    a first set of characters indicative of at least one part image;
    a second set of characters indicative of an initial position for the at least one part image; and
    a third set of characters indicative of at least one movement parameter corresponding to motion of the at least one part image along a trajectory; and
the wireless communication device using the image representative code sequence to display an animated image depicting the at least one part image moving along the trajectory from the initial position according to the first, second, and third sets of characters.

11. The method according to claim 10, wherein the third set of characters is indicative of an angular velocity, and wherein at least one of the first, second, and third sets of characters is one character long.

12. The method according to claim 10, wherein the text message is a short message service message, and wherein the trajectory includes a non-linear portion.

13. The method according to claim 10, wherein the image representative code sequence includes compacted codes, and wherein the at least one part image moving along the trajectory includes the at least one part image changing direction to simulate bouncing from a boundary.

14. The method according to claim 10, further comprising obtaining said set of part images from a server in a network.

15. The method according to claim 14, wherein said network comprises a mobile telephone network.

16. The method according to claim 10, wherein the wireless communication device is selected from the group consisting of a computer, a personal digital assistant, and a mobile telephone.

17. The method according to claim 10, wherein the text message further includes text elements usable by the wireless communication device to display text.

18. The method according to claim 17, wherein a possible character length of the text elements is reduced by a character length of the image representative code sequence such that an overall character length of the text message does not exceed the character limit.

19. The method according to claim 10, wherein the wireless communication device comprises a mobile telephone.

20. The method according to claim 10, wherein the wireless communication device comprises a personal digital assistant.

21. An apparatus, comprising:
first means for receiving input indicative of:
    a set of part images;
    positions to be occupied in an animated image for one or more part images in said set of part images; and
    at least one movement parameter for at least one part image in said set of part images; and
second means for creating a text message conforming to a text messaging protocol that specifies a character limit, wherein the text message includes an image representative code sequence, different portions of which specify:
    a first set of characters indicative of the at least one part image;
    a second set of characters indicative of an initial position for the at least one part image; and
    a third set of characters indicative of the at least one movement parameter for the at least one part image;
    wherein the text message is usable by a telephone to display motion of the at least one part image from the initial position along a trajectory according to the first, second, and third sets of characters.

22. The apparatus according to claim 21, wherein the at least one movement parameter relates to angular velocity.

23. The apparatus according to claim 21, wherein the text messaging protocol is short message service, and wherein the second means is configured to employ compacting codes in the image representative code sequence.

23. The apparatus according to claim 21, wherein the motion along the trajectory includes the at least one part image changing direction of motion to simulate bouncing from an object or a boundary.

25. The apparatus according to claim 21, comprising a server.

26. The apparatus according to claim 21, wherein the text message further includes text elements usable by the telephone to display text, and wherein a possible character length of the text elements is reduced by a character length of the image representative code sequence such that an overall character length of the text message does not exceed the character limit.

27. The apparatus according to claim 21, comprising the telephone.

28. The apparatus according to claim 21, comprising a personal digital assistant.

29. The apparatus according to claim 21, further comprising:
- third means for sending the text message to at least one receiving device selected from the group consisting of a computer, a personal digital assistant, and a receiving mobile telephone;
- wherein the motion along the trajectory includes motion of the at least one part image along a curved path.

30. An apparatus, comprising:
- first means for receiving a text message, wherein the text message has a character limit and includes an image representative code sequence, different portions of which specify:
  - a first set of characters indicative of at least one part image;
  - a second set of characters indicative of an initial position for the at least one part image; and
  - a third set of characters indicative of at least one movement parameter corresponding to motion of the at least one part image along a path; and
- second means for using the image representative code sequence to display an animated image that includes the at least one part image moving along the path from the initial position according to the first, second, and third sets of characters.

31. The apparatus according to claim 30, wherein the third set of characters is indicative of a linear velocity and a spin axis.

32. The apparatus according to claim 30, wherein the text message is a short message service message, and wherein the third set of characters is indicative of a linear velocity and rotation angle.

33. The apparatus according to claim 30, wherein the image representative code sequence includes compacted codes.

34. The apparatus according to claim 30, comprising third means for obtaining said set of part images from a server in a network.

35. The apparatus according to claim 34, wherein said network comprises a mobile telephone network, and wherein the at least one part image moving along the path includes simulating bouncing of the at least one part image.

36. The apparatus according to claim 30, wherein the apparatus is selected from the group consisting of a computer, a personal digital assistant, and the mobile telephone.

37. The apparatus according to claim 30, wherein the text message further includes text elements usable by the apparatus to display text, and wherein the path includes a curved portion.

38. The apparatus according to claim 37, wherein a possible character length of the text elements is reduced by a character length of the image representative code sequence such that an overall character length of the text message does not exceed the character limit.

39. The apparatus according to claim 30, comprising a personal digital assistant.

40. A device, comprising:
- an input interface configured to receive selection information indicative of an animated image;
- a processor coupled to the input interface, wherein the processor is configured to cause the device to create a text message that includes an image representative code sequence that is indicative of the selection information, wherein the image representative code sequence has different portions specifying:
  - a first set of characters indicative of at least one part image;
  - a second set of characters indicative of an initial position for the at least one part image; and
  - a third set of characters indicative of at least one movement parameter for the at least one part image;
- wherein the text message has a character limit, and wherein the text message is usable by a telephone to display motion of the at least one part image from the initial position along a trajectory according to the first, second, and third sets of characters; and a wireless transmission interface coupled to the processor, the wireless transmission interface being configured to send the text message to a receiving device.

41. The device of claim 40, wherein the selection information comprises:
- the at least one part image; and
- one or more animation properties of the animated image;
- wherein the motion of the at least one part image includes simulating the at least one part image changing direction in response to contacting an object or boundary.

42. The device of claim 40, wherein the character limit is less than or equal to 160 characters, and wherein at least one of the first, second, and third sets of character is one character long.

43. The device of claim 40,
- wherein the text message further includes text elements usable by the telephone to display text;
- wherein a possible character length of the text elements is reduced by a character length of the image representative code sequence such that an overall character length of the text message does not exceed the character limit; and
- wherein the trajectory includes a non-linear portion.

44. A device, comprising:
- a wireless reception interface configured to receive a text message that includes an image representative code sequence, wherein the text message has a character limit, and wherein the image representative code sequence includes different portions specifying:
  - a first set of characters indicative of at least one part image;
  - a second set of characters indicative of an initial position for the at least one part image; and
  - a third set of characters indicative of at least one movement parameter corresponding to motion of the at least one part image along a trajectory;

a processor coupled to the wireless reception interface, the processor being configured to determine the image representative code sequence from the text message; and a display interface coupled to the processor, the display interface being configured to display an animated image depicting the at least one part image moving along the trajectory from the initial position according to the first, second, and third sets of characters;

wherein the device is a telephony device.

45. The device of claim 44, wherein the trajectory includes a curved portion.

46. The device of claim 44, wherein the character limit is less than or equal to 160 characters; and wherein the at least one part image moving along the trajectory changes direction of movement to simulate bouncing from an object.

47. The device of claim 44, wherein:

the text message further comprises text elements usable by the telephony device to display text; and a possible character length of the text elements is reduced by a character length of the image representative code sequence such that an overall character length of the text message does not exceed the character limit.

* * * * *